US008104080B2

(12) United States Patent
Burns et al.

(10) Patent No.: US 8,104,080 B2
(45) Date of Patent: Jan. 24, 2012

(54) UNIVERSAL SCHEMA FOR REPRESENTING MANAGEMENT POLICY

(75) Inventors: Steven Patterson Burns, Redmond, WA (US); Derek Menzies, Sammamish, WA (US); Andrea Rose Westerinen, Issaquah, WA (US); Anders Vinberg, Kirkland, WA (US)

(73) Assignee: Microsoft Corporation, Redmod, WA (US)

( * ) Notice: Subject to any disclaimer, the term of this patent is extended or adjusted under 35 U.S.C. 154(b) by 1077 days.

(21) Appl. No.: 11/627,941

(22) Filed: Jan. 26, 2007

(65) Prior Publication Data

US 2008/0184201 A1    Jul. 31, 2008

(51) Int. Cl.
   *G06F 9/00* (2006.01)
(52) U.S. Cl. ............... 726/14; 717/121; 726/27; 705/51
(58) Field of Classification Search .................. 717/121; 726/14, 27; 705/51
   See application file for complete search history.

(56) References Cited

U.S. PATENT DOCUMENTS

| | | | |
|---|---|---|---|
| 6,205,481 B1 | 3/2001 | Heddaya et al. |
| 6,381,639 B1 | 4/2002 | Thebaut et al. |
| 6,538,668 B1 | 3/2003 | Ruberg et al. |
| 6,675,355 B1 | 1/2004 | Demopoulos |
| 6,684,244 B1 | 1/2004 | Goldman et al. |
| 6,711,585 B1 | 3/2004 | Copperman et al. |
| 6,826,698 B1 | 11/2004 | Minkin et al. |
| 6,859,217 B2 | 2/2005 | Robertson et al. |
| 7,032,014 B2 | 4/2006 | Thiyagarajan et al. |
| 7,134,072 B1 | 11/2006 | Lovett |
| 7,137,119 B1 | 11/2006 | Sankaranarayan et al. |
| 7,155,534 B1 | 12/2006 | Meseck et al. |
| 7,181,438 B1 | 2/2007 | Szabo |
| 7,266,548 B2 | 9/2007 | Weare |
| 7,512,965 B1 | 3/2009 | Amdur et al. |
| 7,617,160 B1 | 11/2009 | Grove et al. |
| 2002/0030703 A1 | 3/2002 | Robertson et al. |
| 2002/0188643 A1 | 12/2002 | Kennedy |

(Continued)

FOREIGN PATENT DOCUMENTS

JP    07-225765 A1    8/1995

(Continued)

OTHER PUBLICATIONS

Sloman, Morris, Policy Driven Management for Distributed Systems, Journal of Network and Systems Management, http://exjobb.robcos.com/pbnm/sloman94policy.pdf, Revised Sep. 13, 1993, 22 pages, vol. 2, No. 4, Plenum Press.

(Continued)

*Primary Examiner* — David Pearson
*Assistant Examiner* — Angela Holmes
(74) *Attorney, Agent, or Firm* — Senniger Powers LLP

(57) ABSTRACT

A computer-readable storage medium has a data structure stored thereon for constructing expressions representing software configurations to be applied to software. The data structure includes a first data field including data identifying a name of software setting for the application. A second data field includes data representing an assertion portion of an policy rule for configuring the configurations identified in the first data field to be applied to the software. The data structure also includes a third data field storing data representing an action portion of the policy rule. The second data field and the third data field form the policy rule. A fourth data field stores metadata describing the policy rule represented by the first data field, the second data field, and the third data field.

9 Claims, 9 Drawing Sheets

U.S. PATENT DOCUMENTS

| | | |
|---|---|---|
| 2003/0053106 A1 | 3/2003 | Kuroda et al. |
| 2003/0225697 A1* | 12/2003 | DeTreville .................. 705/51 |
| 2003/0234808 A1 | 12/2003 | Huang et al. |
| 2004/0148367 A1 | 7/2004 | Takano et al. |
| 2004/0153350 A1 | 8/2004 | Kim et al. |
| 2004/0193459 A1 | 9/2004 | Delaney et al. |
| 2004/0204949 A1 | 10/2004 | Shaji et al. |
| 2004/0225727 A1 | 11/2004 | Koops et al. |
| 2004/0230572 A1 | 11/2004 | Omoigui |
| 2004/0261018 A1 | 12/2004 | Dunne |
| 2004/0267718 A1 | 12/2004 | Milligan et al. |
| 2004/0267764 A1 | 12/2004 | Rothman et al. |
| 2005/0038765 A1 | 2/2005 | Sterling et al. |
| 2005/0138416 A1 | 6/2005 | Qian et al. |
| 2005/0177602 A1 | 8/2005 | Kaler et al. |
| 2005/0267765 A1 | 12/2005 | Jeng et al. |
| 2005/0278310 A1 | 12/2005 | Abrams et al. |
| 2005/0278342 A1 | 12/2005 | Abdo et al. |
| 2006/0010369 A1 | 1/2006 | Naundorf et al. |
| 2006/0025985 A1 | 2/2006 | Vinberg et al. |
| 2006/0031930 A1 | 2/2006 | Patrick et al. |
| 2006/0053151 A1 | 3/2006 | Gardner et al. |
| 2006/0092861 A1 | 5/2006 | Corday et al. |
| 2006/0155716 A1 | 7/2006 | Vasishth et al. |
| 2006/0206440 A1 | 9/2006 | Anderson et al. |
| 2006/0224550 A1 | 10/2006 | Gopisetty et al. |
| 2007/0011193 A1 | 1/2007 | Coker |
| 2007/0027861 A1 | 2/2007 | Huentelman et al. |
| 2007/0033273 A1 | 2/2007 | White et al. |
| 2007/0055680 A1 | 3/2007 | Statchuk |
| 2007/0169049 A1 | 7/2007 | Gingell et al. |
| 2007/0180490 A1 | 8/2007 | Renzi et al. |

FOREIGN PATENT DOCUMENTS

| | | |
|---|---|---|
| JP | 11-282882 A1 | 10/1999 |
| JP | 2003-006242 | 1/2003 |
| JP | 2004-185180 A1 | 7/2004 |
| JP | 2006-507580 | 3/2006 |
| JP | 2006243929 A | 9/2006 |
| KR | 20020042939 A | 6/2002 |
| WO | 2004046963 A1 | 6/2004 |

OTHER PUBLICATIONS

Moffett, Jonathan, D., et al., Policy Hierarchies for Distributed Systems Management, IEEE Journal on Selected Areas in Communications, http://www.moffett.me.uk/jdm/pubs/polhiere.pdf, Jul. 5, 1993, 19 pages, vol. 11(9), pp. 1404-1414.

International Search Report and Written Opinion, Application No. PCT/US2008/051721, dated Jun. 20, 2008.

International Search Report and Written Opinion, International Application No. PCT/US2008/057746, dated Aug. 21, 2008, 11 pages.

* cited by examiner

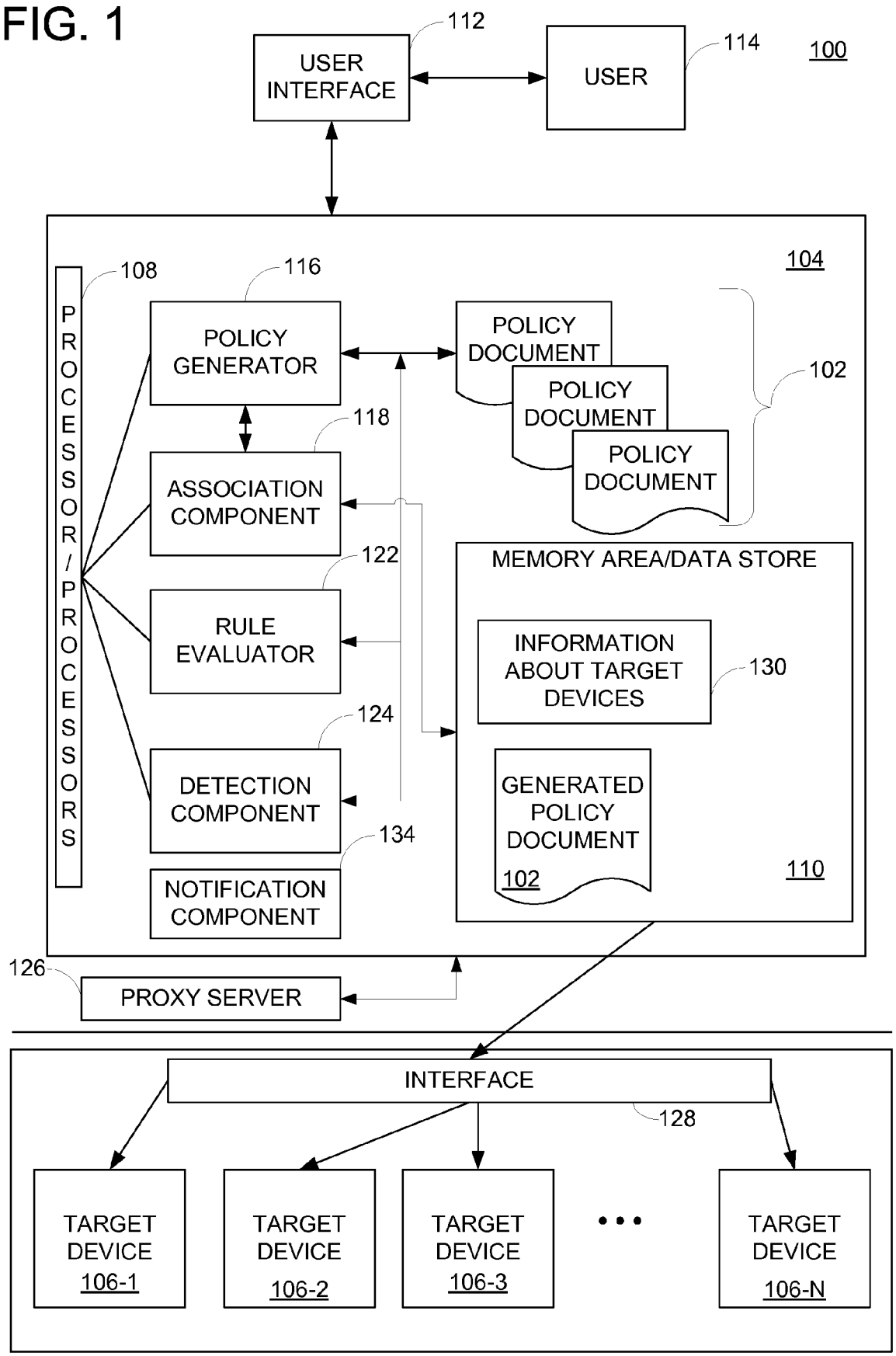

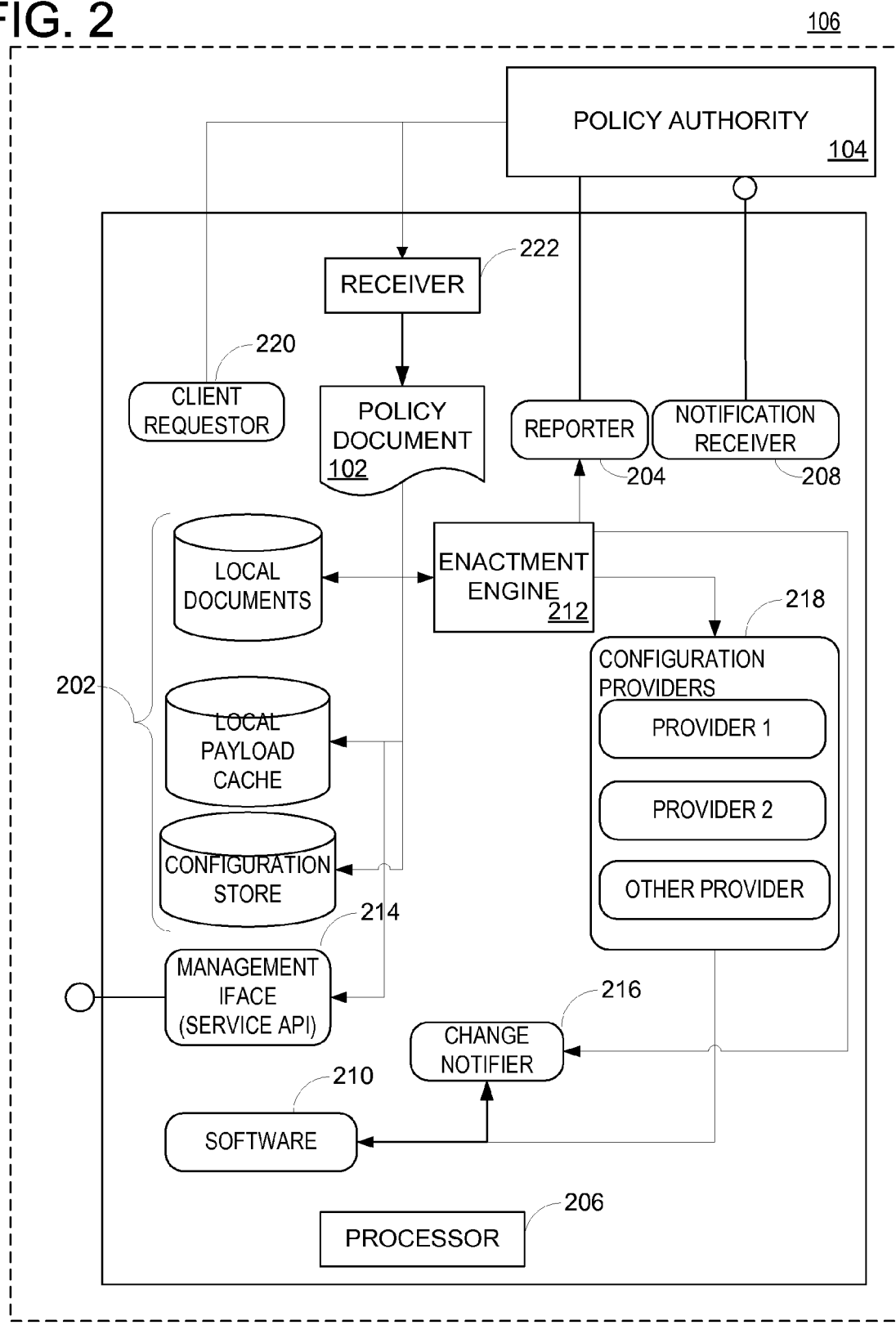

FIG. 3A

POLICY GENERATION SCREEN

ADMINISTRATOR IDENTIFICATION: — 302

304

RULE:

ASSERT(SCREENSAVER.TIMER < 15)

...

306

SELECT TARGET:

| GROUP 1 |
| BUILDING K |
| BUILDING 15 |
| ALL |
| ACCOUNTING |

— 308

CREATE NEW GROUP — 310

312

DELIVERY OPTIONS:

IMMEDIATE/EXPEDITED ✓

SCHEDULED ☐

314

CONFLICT RESOLUTION PREFERENCES:

CONFLICT DETECTED?  YES → RULE 120; CREATED BY ADMIN ID AA ON 12/14/2006...

NO

MORE INFO — 316

OVERRIDE ☐
SYSTEM ✓
CUSTOMIZE ☐

IF ADMIN ID = XBX
THEN OVERRIDE RULE PARAMETER; — 318

FIG. 5A

```
<RULES>
  <RULE RULEID="RULE301">
    <SOFTWAREITEMID>HTTP://EXAMPLE.SOFTWARE.ITEM</SOFTWAREITEMID>
    <SETTINGNAME>SCREENSAVERTIMEOUT</SETTINGNAME>
    <ASSERTIONEXPRESSION>(. > 15) AND (. < 25)</ASSERTIONEXPRESSION>
    <RULEACTION>
      <RULEACTIONVERB>COMPUTECOMPLIANTVALUE</RULEACTIONVERB>
    </RULEACTION>
  </RULE>
</RULES>
```

FIG. 5B

```
AN EXAMPLE OF SETTINGVALUES AS THEY APPEAR IN A SETTINGSVALUES
DOCUMENT:

<SIMPLEINTSETTING>
 <VALUE>10</VALUE>
</SIMPLEINTSETTING>

<SAMPLESCALARSTRUCTSETTING>
 <VALUE>
  <MEMBERA>12</MEMBERA>
  <MEMBERB>HELLO, WORLD</MEMBERB>
 </VALUE>
</SAMPLESCALARSTRUCTSETTING>

<SAMPLEINTARRAYSETTING>
 <VALUE>1</VALUE>
 <VALUE>2</VALUE>
 <VALUE>3</VALUE>
 <VALUE>8</VALUE>
 <VALUE>9</VALUE>
 <VALUE>10</VALUE>
</SAMPLEINTARRAYSETTING>

<SAMPLEAGGREGATESTRUCTSETTING>
 <VALUE>
  <ANINTMEMBER>1</ANINTMEMBER>
  <AFLOATMEMBER>1.0</AFLOATMEMBER>
  <ASTRINGMEMBER>ONE</ASTRINGMEMBER>
 </VALUE>
 <VALUE>
  <ANINTMEMBER>2</ANINTMEMBER>
  <AFLOATMEMBER>2.0</AFLOATMEMBER>
  <ASTRINGMEMBER>TWO</ASTRINGMEMBER>
 </VALUE>
</SAMPLEAGGREGATESTRUCTSETTING>
```

UNIVERSAL SCHEMA FOR REPRESENTING MANAGEMENT POLICY

BACKGROUND

In a distributed computing network, software is installed on devices connected in the network. As users become familiar with the software running on their computers, they often alter the configuration of software to personalize it, secure it, etc. For example, a user may wish to change the appearances of the graphical user interface (GUI) for particular software, while another user may wish to set a specific timer for the screen saver program. A third user may wish to configure the media player appearance mode by hiding the media player toolbar and so forth.

While software may be personalized or customized to suit each user's taste or preference, network administrators typically wish to configure all software installed on each of the devices in the network with identical or uniform configurations. A uniform configuration not only makes deployment of the software more convenient, it also makes troubleshooting and maintenance tasks easier.

Typically, network administrators, information technology (IT) managers, and the like (collectively referred to as "IT management") create a management policy that includes the intention and the goal of the IT management. Each individual device or system is responsible for regulating itself to comply with the policy. Currently, the IT management may create a policy rule, such as activating the screen saver program after a computer is idle for fifteen minutes, to be deployed to the computer. The IT management may place the policy in a policy authority, of which some embodiments may refer to as a policy authority, and the policy authority periodically broadcasts a notification to the computer indicating a policy is to be received. The computer would need to be in an active connection with the policy authority for the policy to be executed on the computer.

In another practice, the policy authority may notify a listening component of the computer indicating that a policy is to be downloaded. Once an active connection is made with the policy authority, the computer downloads the policy and saves the policy in a memory area of the computer to be executed with or without having an active connection with the policy authority.

While these practices have been sufficient for performing certain tasks such as deployment of policies managing the software configuration, there are drawbacks. For example, some of the devices to be managed in the network may be complex and may need a customized format or syntax for the policy expression or rules. Therefore, a special set of policies may be required.

Another shortfall includes that, after the policy is deployed, the IT management lacks the ability to determine whether similar policies for the same target device create a conflict. For example, suppose an IT management staff A creates a policy for configuring the screen saver program to be activated after 15 minutes while, at the same time, another IT management staff B attempts to create a different policy for 20 minutes for the screen saver activation time. At the time of deployment, the IT management staff A would not know there might be a conflict with the different policy created by the IT management staff B. For the target device, the software would just adopt the policy from both and keeps on changing the configuration. Alternatively, a hardcoded rule, such as based on the time when the rules are received, may choose that the policy created by the IT management staff A overrides the policy by the IT management staff B.

Additionally, existing policies are imperative in which each of the policies are a set of instructions that the target devices of the policies is supposed to execute. The existing policy deployment framework also lacks a feedback loop wherein the target device of a policy can report its compliance with that policy to the policy authority or the IT management staff.

SUMMARY

Embodiments of the invention overcome deficiencies of existing systems or practices by defining a schema for policy rules or executable expressions for managing software configuration. Embodiments of the invention further establish conflict detection of conflict policy rules before the rules are deployed to the target devices. In addition, aspects of the invention further receive responses from each of the target devices indicating the status or state of the software after the policy rules are applied.

In addition, aspects of the invention provide a declarative paradigm in the policy implementation in which each of the policies, having schemas associated therewith, describes the valid end state of the target devices, and the target devices decide how to reach that state. This declarative feature at least enables the means by which the desired end-state is reached to evolve over time without need of changing the expression of the policy, and enables expressing the policies in a form that is more readily machine-processed so as to enhance the conflict detection/resolution capability. Furthermore, aspects of the invention provide a feedback loop for the target devices to report their compliance with that policy to the policy authority. Moreover, embodiments of the invention enhance extensibility of deployment of policy documents by employing a proxy server may perform tasks, such as policy requesting, for the target devices.

According to alternative aspects of the invention, schemas or document formats define uniform or standard relationships between objects and/or rules for configuring software configuration and/or settings and/or states. Embodiments of the invention also enhance representation of software states before the policy documents are applied.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 1 is a block diagram illustrating an exemplary embodiment of a system for managing software configurations for software installed on target devices in a distributed computer network according to an embodiment of the invention.

FIG. 2 is a block diagram illustrating exemplary components for applying software configurations to software on a target device according to an embodiment of the invention.

FIG. 3A is an exemplary graphical screen shot illustrating a policy generation user interface according to an embodiment of the invention.

FIG. 5A is an exemplary XML policy document generated according to an embodiment of the invention.

FIG. 5B is an exemplary document generated on a managed target device as part of the application of policies on the target device according to an embodiment of the invention.

Figure 3B:
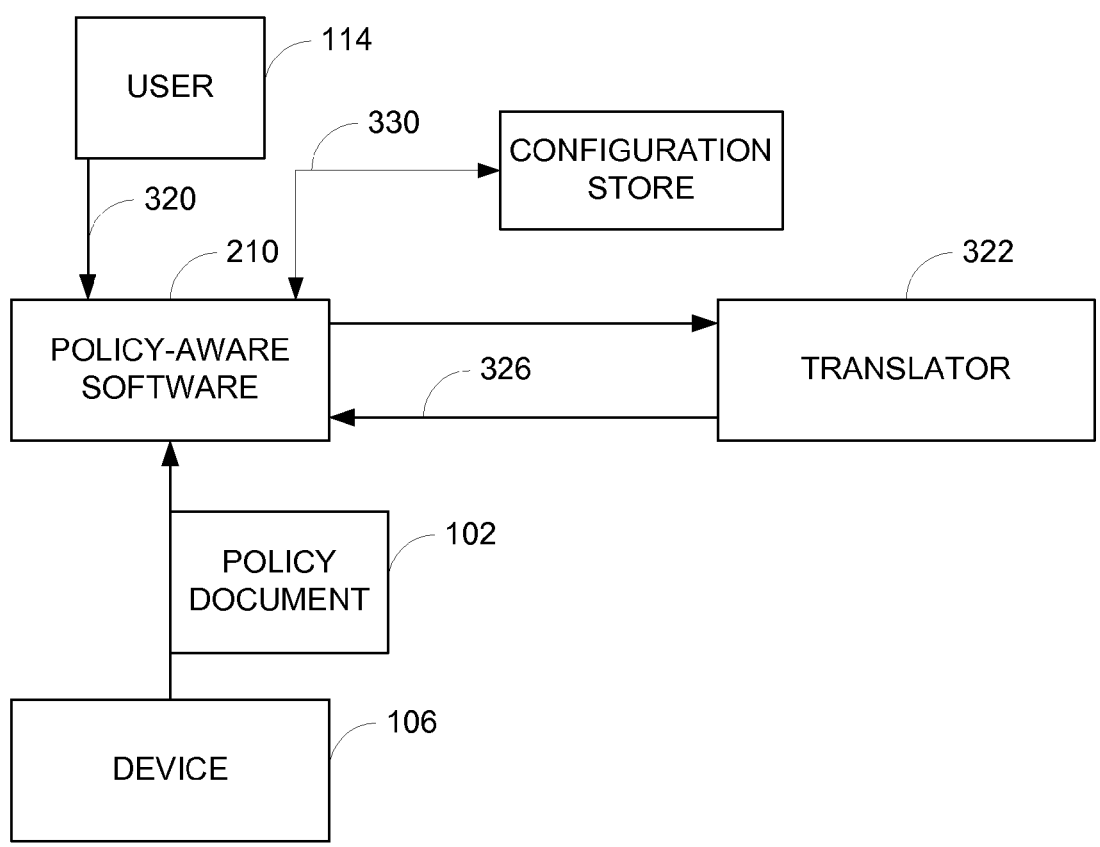
FIG. 3B is a block diagram illustrating interactions between a policy authority and a device in applying policy rules to the device according to an embodiment of the invention.

Appendix A illustrates an exemplary definition for data types applicable in embodiments of the invention.

Appendix B illustrates an exemplary list of operators on scalar types used in the policy rules definition appearing in the policy document according to an embodiment of the invention.

Appendix C illustrates one or more exemplary operators on aggregate types used in the definition of policy rules according to an embodiment of the invention.

Appendix D illustrates an exemplary set of action types to be used in a policy document according to an embodiment of the invention.

Corresponding reference characters indicate corresponding parts throughout the drawings.

DETAILED DESCRIPTION

Embodiments of the invention establish a platform for efficient management of configurations and states of software installed on one or more target devices available throughout a computer network. Rather than limiting policy applications to patches or to just data stored in a specific location as with current technologies, embodiments of the invention provide a common platform or schema to apply the policies throughout the networked environment. Thus, many disparate and non-cooperating systems are no longer needed to provide a comprehensive management-by-policy solution. Furthermore, aspects of the invention provide conflict resolution and/or detection capabilities to resolve conflicts between rules in a policy document and permit adequate report or feedback from the target devices with respect to the status or state of the target devices before and after the policy rules are applied.

Referring now to FIG. 1, a block diagram illustrates a system 100 for managing configurations for software using a policy document 102 installed on target devices in a distributed computer network according to an embodiment of the invention. The system 100 includes a policy authority 104 for providing services to one or more target devices 106. The policy authority 104 may be a computer, a server computer, a computing device, a cluster of computers, a cluster of computing devices, or a cluster of processing units, such as a processing unit or a processor 108. For the sake of simplicity and without limitation, the policy authority 104 illustrated below is embodied in a policy authority. It is to be understood that the policy authority may be implemented or embodied in other managed devices, such as target devices 106, without departing from the scope of the invention. The policy authority 104 is also associated with or coupled to a memory area or a data store 110. For example, the data store 110 may include a database, a memory storage area, and/or a collection of memory storage units. In an alternative embodiment, the data store 110 is connected by various networking means, such as a wired network connection or a wireless network connection. In another example, communication media, such as a wired network or direct-wired connection, and wireless media, such as acoustic, RF, infrared, and other wireless media, typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Aspects of the invention may be illustrated by using FIG. 3A as a starting point. FIG. 3A illustrates an exemplary graphical screen shot 300 illustrating a policy generation user interface (e.g., user interface 112) according to an embodiment of the invention. It is to be understood that the content of the graphical screen shot 300 may be represented by other means, such as a script-based or text-based interface. The graphical screen shot 300 includes a field 302 for administrator identification input. For example, an administrator may enter his or her name in the field 302 to identify who is creating the policy document 102. The graphical screen shot 300 also includes a field 304 for details about policy rules. Using the simplistic example of setting screen saver time period above, a user 114 may define a set of policy rules for software. In one embodiment, software includes an application, such as a screen saver program, a collection of applications or components of applications, an operating system, or the like in the field 304. The rule may be complex with operators, operands, and other values for defining a set of policy rules. In an alternative embodiment, the user 114 may use one or more defined data types for describing data to be included in the policy document 102 as shown in Appendix A, one or more exemplary operators on scalar types used in the policy rules definition appearing in the policy document illustrated in Appendix B, one or more exemplary operators on aggregate types used in the definition of policy rules in Appendix C, and one or more exemplary action types in Appendix D. In another alternative embodiment, the user 114 may compose the rule in XML format or other format or schema such that the policy rules may be executed and evaluated by the policy authority 104. Other format or schema for creating or defining executable expressions for universal application to various software may be used without departing from the scope of the invention. For example, FIG. 5A illustrates a relatively simplistic example of the policy document in XML according to an embodiment of the invention.

Referring further to the example of FIG. 3A, the graphical screen shot 300 also includes a target selection section 306 in which the user 114 may define or select a set of target devices. For example, as shown in an existing selection 308, the following target group is available: "Group 1," "Building K," "Building 15," "All," and "Accounting." Each of the groups defines its membership information of the target devices. For example, "Group 1" may include target devices associated with the IT management, while "Accounting" group may include all target devices in the accounting department. In an alternative embodiment, the graphical screen shot 300 may include additional operations to provide additional information relating to each member in a group or each group. For instance, the user 114 may use the right button on a common mouse input device to see additional details about each group or each member within a group. In a further embodiment, the graphical screen shot 300 includes a button 310 to enable the user 114 to create additional group for the target devices 106.

The graphical screen shot 300 also includes one or more delivery options in a field 312. For example, the user 114 may select an immediate or expedited delivery of the policy document to the set of selected target devices or a scheduled delivery of the policy document to the set of selected target devices. In one embodiment, when the immediate or expedited delivery option is selected, a notification may be issued to the set of selected target devices indicating that the policy document is to be retrieved. In the embodiment when a scheduled delivery is selected, the policy authority 104 may provide the policy document 102 via an interface 128 or temporarily store the policy document 102 in a content distribution data store to be retrieved at a scheduled time period and after the conflict resolution. Other delivery options may be provided without departing from the scope of the invention.

The graphical screen shot 300 includes a set of conflict resolution preferences 314 in which the user 114 may set preferences to resolve conflicts between to policy rules. For example, suppose an IT management staff member attempts to set a rule to activate the screen saver program after a 15-minute idle time period, while another IT management staff member attempts to set a rule to active the screen saver program after 10 minutes of idle time. Under existing technologies, these rules are executed as defined without either staff member knowing there was a conflict. Embodiments of the invention enable a federated conflict detection/resolution and provide both conflict detection and conflict resolution, as illustrated in section 314. For example, FIG. 3A illustrates that the policy authority 104 or components of the policy authority 104 detected a conflict between the created policy document and an existing rule "Rule 120" created by an administrator with an ID "AA" on Dec. 14, 2006. The user 114 may obtain additional or further information by click a button 316.

The user 114 may also select one or more exemplary conflict resolution preferences as listed in section 314: overriding the previously created rule, yielding to the previously created rule, or executing a customized rule. It is to be understood that other options to resolve conflict may be available without departing from the scope of the invention. For example, FIG. 4A describes other conflict resolution preferences and will be described in further detail below. A box 318 provides an input field for the user 114 to define the customized rule to resolve conflicts. As such, aspects of the invention provide automatic conflict detection when policies are assigned to targets and enable administrators to know as soon as possible when their newly assigned policy conflicts with an existing one. In addition, administrators will have some flexibility in determining if and how conflicts are automatically resolved by the system or arbitrarily according to the user 114. Moreover, embodiments of the invention may establish an execution order or hierarchy for the one or more policy rules.

It is also to be understood that, while the graphical screen shot 300 in FIG. 3A illustrates one or more selectable operations for using embodiments of the invention, other means of expressing the operations discussed above may be used. For example, a free-form template may be used in which the operations are to be selected and corresponding tags are automatically inserted in a draft policy document in real time after the operations are selected. In this example, the user 114 may select (e.g., using an input device) any operations, such as "Select Target," and the corresponding tags may be inserted in to a draft policy document in real time. In a further alternative embodiment, drop-down-menus or other dynamic GUI techniques may be employed to further the generation of the policy document according to an embodiment of the invention.

Referring again to FIG. 1 and as illustrated above in FIG. 3A, the policy document 102 is generated in response to instructions and preferences of the user 114. In one example, a collection of the policy document may be provided to the policy authority 104 via automated means, such as in a batch. In another embodiment, the graphical screen shot 300 shown in FIG. 3A is provided by a policy generator 116 which receives instructions or input from the user 114 to generate the policy document. An association component 118 associates a selected set of target devices 106 with the policy document 102 based on the instructions from the user 114. The association component 118 also associates a set of target information 130 with the policy document 102. In one embodiment, the information about the selected set of target devices include information about the software installed on the target devices and information relating to characteristics of each software of the selected set of target devices. For example, the information may include whether the software is based on legacy system, or the like.

Once the selected set of target devices 106 is associated with the policy document 102, a rule evaluator 122 compares the set of policy rules included in the policy document 102 with other policy rules for the software with respect to the target devices. For example and again referring to FIG. 3A, the rule evaluator 122 compares the policy document 102 with existing or pending policy documents yet to be applied to the selected set of target devices. For example, the rule evaluator 122 compares the policy document 102 with the existing or pending policy documents created by a second instruction (e.g., from a user or pre-configured in an operating system, policy authority 104, client 106 or other automated sources). In another embodiment, a detection component 124 scans the content of the policy documents and compares the policy rules in each of the policy documents to determine whether there is a conflict between two policy rules within the policy document. In another alternative embodiment, the policy document 102 may be modified, either by the user 114 or by components of the policy authority 104, to resolve the conflict. For example, FIG. 3A discusses at least one method of resolving conflicts based on the conflict resolution preferences.

Once the policy document 102 is validated, the policy document 102 is compared by the rule evaluator 122, the policy document 102 is made available by the policy authority 104 to the selected set of target devices 106. An interface 126 receives the policy document 102 from the policy authority 104 and the selected set of target devices 106 may retrieve the policy document 102 from the policy authority 104 via the interface 126 or received a notification first before retrieving the policy document 102. In one embodiment, the interface 126 may be stateless, such as acting as a gateway between the policy authority 104 and the target devices 106, and does not store the policy document 102. For example, the policy authority 104 includes a notification component 134 for transmitting the notification to the target devices. In yet another embodiment, the policy authority 104 may include a proxy server 126 for performing part of the operations for notifying the selected set of target devices 106 (to be discussed further in FIG. 2). In yet another alternative embodiment, the policy generator 116, the association component 118, the rule evaluator 122, and the detection component 124 are computer-executable components embodied in one or more computer-readable media.

Referring now to FIG. 2, a block diagram illustrates exemplary components associated with the target device 106 according to an embodiment of the invention. The target device 106 includes a collection of local memory area 202, which includes storage area for storing the policy document 102 transmitted from the policy authority 104, cache of the policy document, and a data store storing configuration settings (e.g., a configuration store). The target device 106 also includes a processor 206 for executing computer-executable instructions, codes, executable expressions, or the like. The target device 106 also includes a notification receiver 208 or a listener for periodically monitoring a notification or availability of the policy document from the policy authority. In one example, the notification receiver 208 may contact the policy authority at a predetermined time, for example, every 10 days or the like, for the policy document 102. In the instance described above in FIG. 3A when an immediate delivery is requested, the notification receiver 208 may monitor the policy authority periodically for the policy document 102. Once the policy document 102 is available for the target device 106, the policy document 102 is stored locally on the memory area 202 associated with the target device 106. In one embodiment, the target device 106 may establish a first connection with the policy authority 104 when retrieving the policy document from the policy authority 104 and may terminate the first connection after completing the policy document 102 retrieval.

Once the policy document 102 is stored locally on the target device 106, the target device 106 evaluates the policy rules based on the software states of the software 210. For example, software configurations includes configurable parameter, such as screen saver timer value or value for "enabling word wrap" for a text editing software. In another example, software configurations state is stored in various forms in various local memory or data storage areas. These settings state may include state that is a configurable parameter, or other state like the last window size and position of an application window. For simplicity, all forms of such storage are depicted as a single software configuration store (e.g., memory area 202). As such, the target device 106 reviews or examines the policy rules with the current software state to determine whether the software 210 complies with the rules defined in the policy document 102. In an alternative embodiment, one or more settings providers 218 (to be discussed in further details below) are used to retrieve and set current software state from the memory area 202."

An alternative embodiment of the invention includes an enactment engine 212 for applying the policy rules included in the policy document to the software 210 on the target device 106. For example, the enactment engine 212 includes one or more computer-executable components for processing the policy rules. In one example, FIG. 5B illustrates an exemplary document generated on a managed target device as part of the enactment of policies by the enactment engine 212 on the target device according to an embodiment of the invention. In another embodiment, a management interface 214 exposes or provides an application programming interface (API) for the enactment engine 212 to be used by the user 114 to create locally policy documents for the managed target device. As such, the target device 106 may receive the policies from the policy authority 104 or the target device 106 may receive the policies from the user 114 of the target device 106. All policies retrieved are stored in the memory area 202 regardless of the source.

In a further embodiment, the target device 106 also includes a reporter 204 for reporting to the policy authority 104 or the proxy server 126 information associated with the status of the implementation or application of policy rules included in the policy document 102. Embodiments of the invention overcome shortcomings of existing technologies by establishing a common reporting system enabling an easy auditing of the compliance status (e.g., via a change notifier 216) of the software installed on the target device 106 within a distributed computer network.

Alternatively, embodiments of the invention enable the target device 106 to include at least one settings provider 218 for properly applying the software configurations to the software 210. For example, the settings provider 218 reviews the policy rules in the policy document 102 and determines where the settings for the software 210 are located. As such, the settings provider 218 determines, in order to make the software 210 comply with the policy rules in the policy document 102, which part of the software 210 is to be configured. The settings provider 218 next prepares the determined information, such as setting parameter locations, and convert the information to a document with the software configuration values in XML format or other executable expression formats. In another embodiment, the settings providers 218 may act as an interface or intermediary between the enactment engine 212 and the memory area 202, and may translate data in the memory area 202 to and from the common form according to the schema of the invention.

In another embodiment, the target device 106 may include a mobile device or a portable (not shown) and the proxy server 126 in FIG. 1 may perform portions or parts of the operations described above in FIG. 2. For example, due to the processing and/or memory limitation of the portable or mobile device, the proxy server 126 may request the policy document 102 for the portable or mobile device. The proxy server 126 retrieves the policy document 102 on behalf of the portable or mobile device and the enactment engine 212 on the portable or mobile device executes the policy rules. The reporter 204 reports the status or state of the application to the policy authority 104. In yet another aspect of the invention, the target device 106 may include a client requestor 218 for actively requesting the policy document from the policy authority 104.

In one other aspect of the invention, the reporter 204, the notification receiver 206, the enactment engine 210, the management 212, the setting providers 214, the change notifier 216, or the client requester 2220 may be embodied in one or more computer-readable media as computer-executable components coupled to the target device 106. In a further embodiment, the policy authority 104 may be physically embodied with the client 106 on the same hardware or may be co-resident on the same hardware with the client 106 (as illustrated by the broken lines in FIG. 2).

Figure 6:
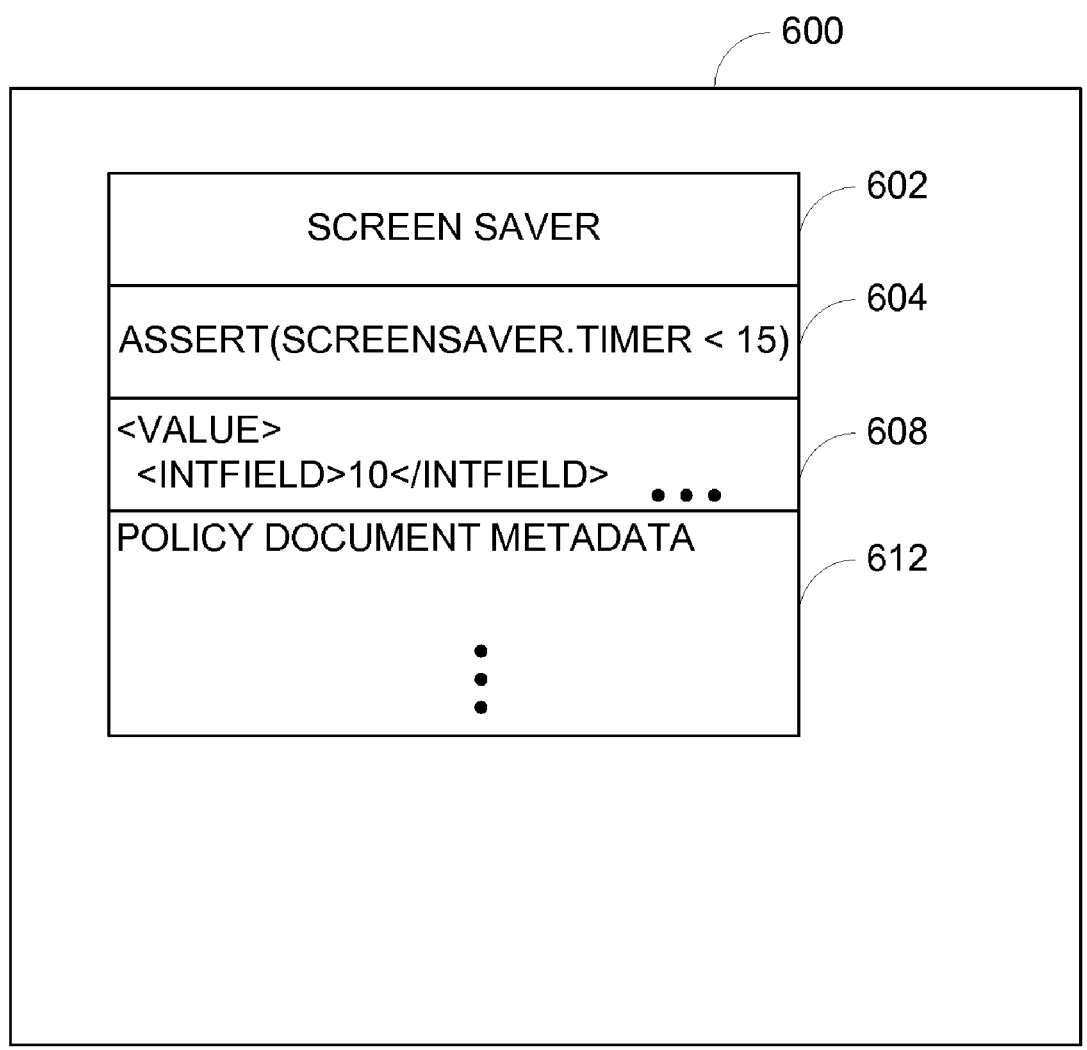
FIG. 6 is a block diagram illustrating a data structure for formatting expressions in a policy document according to an embodiment of the invention.

FIG. 3B is a block diagram illustrating interactions between a policy authority 104 and the policy-aware software 210 installed on a device in applying policy rules to the device according to an embodiment of the invention. In one embodiment, suppose the device (e.g., device 106) already uses a configuration store storing policy documents, the policy authority 104 provides the schema (e.g., as illustrated in FIG. 6) to the configuration store. As such, the interactions for applying the policy rules to the device are between the configuration store and the software 210 on the device to find, extract, or identify the effective value within the policy rules (as shown by a link 330).

In a further embodiment, if the device 106 uses a different data store for storing policy documents and/or policy rules, the policy authority 104 may provide codes, computer-executable instructions, or other executable expressions as a configuration provider (e.g., configuration providers 218). In addition, the policy authority 104 in this situation also provides a schema to describe its configuration possibilities. Based on this setup, the policy authority 104 may interact with the policy-aware software 210 or the software 210 may interact with a backing store to identify or extract effective values within the policy rules/policy documents.

3. If it cannot fit into our implementation of 106, it must create its own implementation of 106.

In an alternative embodiment, embodiments of the invention provide effective constraints features in which the software 210 wishes to identify not just a single value, but also the rules that restrict what the values can be. In one example, the operations described in FIG. 3B may be embodied in an API for the policy-aware application (e.g., software 210). For instance, the software 210 receives a request from the device 106 to configure the application, such as through the policy document 102. The API (e.g., the management interface 214) identifies a constraint included in the received request. The identified constraints including values intending to modify software state of the application. For example, the identified constraints intend modify the screen saver timer to 300 minutes. The API provides, from the application (210), the configuration constraints in response to the identification, and the configuration constraint identifies an effective constraint for modifying the application state of the application. For example, the effective constraint maybe 30 minutes because the effective may provide a maximum allowable value for configuring software configuration. In another embodiment, the effective constraint may be returned as a range of value via a user interface (e.g., interface 128). For example, the effective constraint may specify that the allowable value for configuring the screen saver function may be an integer value between 0 and 30.

In one embodiment, the software may display its own configuration UI and wish to take policy restrictions into account when generating that UI. In this example, the software 210 may receive input 320 from the user 114 specifying an additional policy rule and the additional policy rule includes another constraint to be identified. In yet another alternative embodiment, the API may merge additional policy rule with the policy rule, and the constraints in the additional policy rule and the policy rule are identified. In yet a further embodiment, the API may replace or modify the identified constraint as a function of the effective constraint.

In another alternative embodiment, the received request is transmitted to a translator 322 at 324 and the translator 322 generates an XML based custom grammar from the received request. For example, the software 210 may only process expressions written in a specific programming format and the translator may modify the request to form an XML based custom grammar to be returned to the software 210. For example, the policy document 102 generated by the user 114 is applied to the policy aware software 210 in XML format, which includes XPath expressions.

Figure 4A:
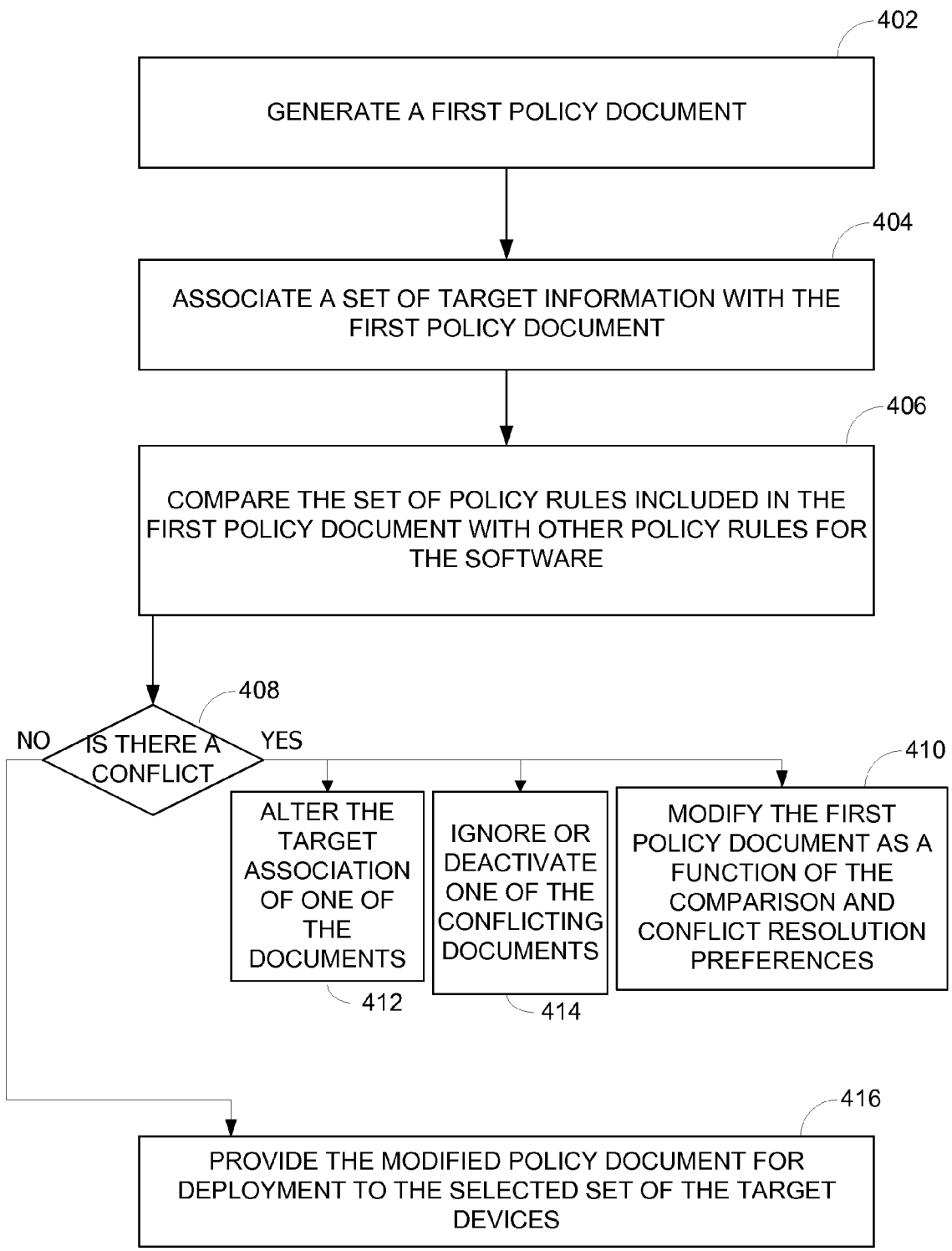
FIG. 4A is an exemplary flow chart illustrating operations of managing software configurations for software installed on target devices according to an embodiment of the invention.

Referring now to FIG. 4A, an exemplary flow chart illustrates operation of managing configurations for software installed on target devices according to an embodiment of the invention. For example, the policy authority 104 and/or various components (e.g., policy generator 116, association component 118, rule evaluator 122, detection component 124, and/or notification component 134) perform one of the operations described in FIG. 4A. At 402, a first policy document is created. The first policy document (e.g., the policy document 102) includes a set of policy rules defining the desired configuration of one or more pieces of software on the target device. The set of target information is associated with the first policy document, and the set of target information corresponds to a selected set of the target devices and includes information relating to characteristics of each software of the selected set of target devices at 404. At 406, the set of policy rules included in the first policy document is compared with other policy rules for the software. For example, if it is determined at 408 that there is a conflict between the first policy document and another policy document, the first policy document is modified as a function of the comparison and conflict resolution preferences at 410.

In another embodiment, other preferences or options, such as altering the target association of one of the documents at 412 or ignoring or deactivating one of the conflicting documents at 414 may be chosen for resolving the conflict. The conflict resolution preferences include factors to determine which policy document to be provided to the software. The modified policy document is provided to the selected set of target devices at 416. If, on the other hand, there is no conflict as determined at 408, the first policy document is provided for deployment to the selected set of the target devices.

Figure 4B:
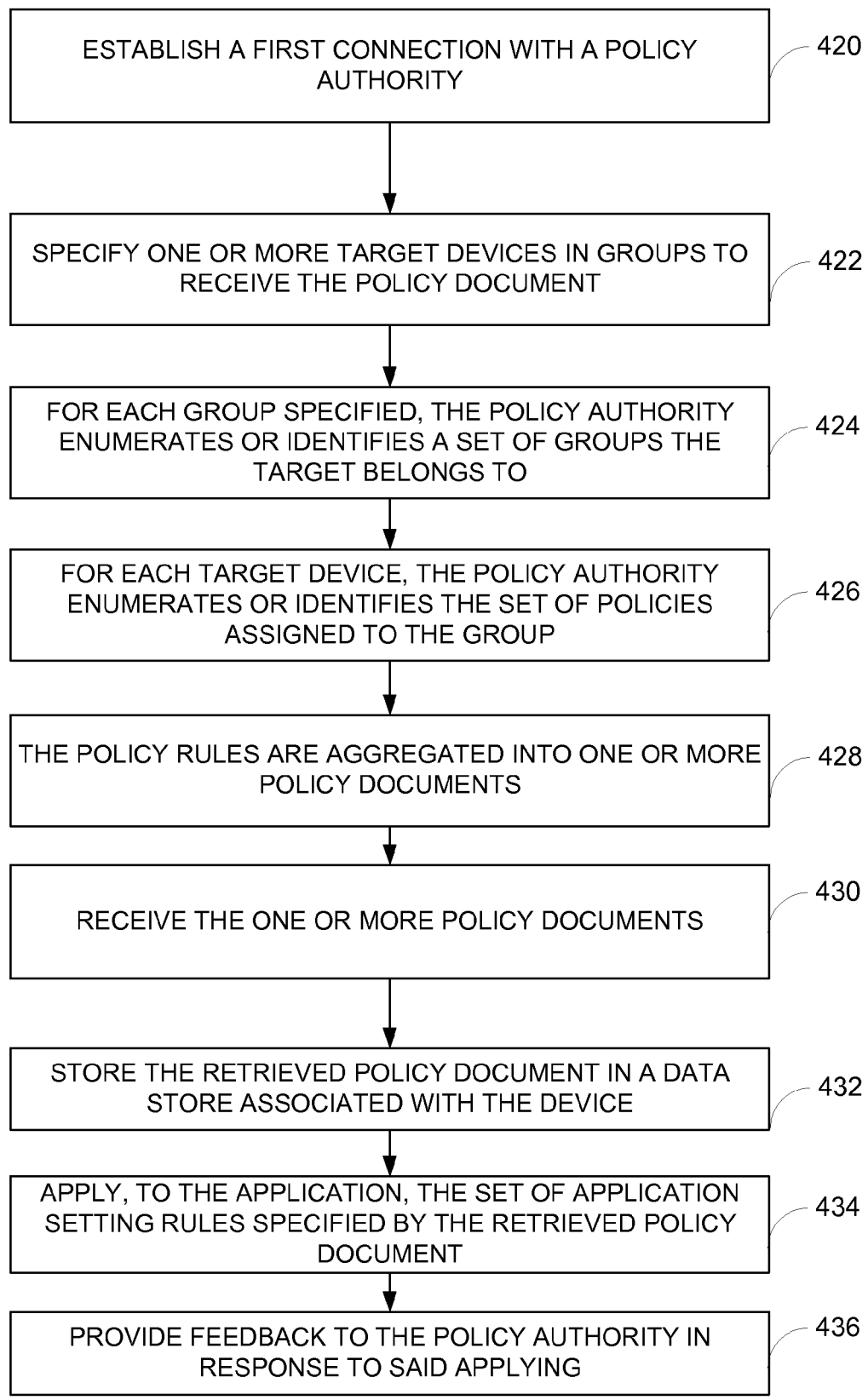
FIG. 4B is an exemplary flow chart illustrating operations of applying software configurations to software installed on a target device according to an embodiment of the invention.

Referring now to FIG. 4B, an exemplary flow chart illustrates operations of applying software configurations to software installed on a device according to an embodiment of the invention. For example, the receiver 222, the reporter 204, the notification receiver 208, the enactment engine 212, the settings provider 218, and the management interface 214 perform at least one or more of the operations described in FIG. 4B. In one embodiment where the policy authority 104 and the target device 104 are connected or coupled via a network, at 420, a first connection is established with the policy authority (e.g., policy authority 104). The connection may be instant, such as via the network through an interface component (e.g., interface 128).

In an alternative embodiment where the policy authority 104 and the target device 104 are embodied in one single unit, one or more policy documents are stored in a computer-readable medium (e.g., a memory area) and are available to the target device. In a further alternative embodiment, a package or a collection of all policy documents associated with a target device is stored on a computer-readable medium (e.g., a CD-ROM or a DVD-ROM) and is made available or accessible to the target device when the computer-readable medium is next delivered to the target device.

At 422, the policy authority 104 specifies a target device or a group of target devices to receive a policy document. For example, as illustrated above in FIG. 3, the user 114 may provide instructions to specify a target device or a group of target devices to receive the policy document. For each specified group, the policy authority 104 enumerates or identifies the target devices belonging to the group at 424. At 426, the policy authority 104 enumerates or identifies the set of policy rules assigned to the target devices for each group. At 428, the policy rules are aggregated into one or more plurality of policy documents.

Under the instant connection scenario, the device (e.g., target device 106) receives the policy document 102 from the policy authority 104 through the first connection via the network at 430 In one embodiment, the receiver 222 receives the policy document for the target device. In another embodiment, the receiver 222 may be part of the interface 128. In another embodiment, the policy document is stored on a computer-readable medium, and the target device receives the policy document through the computer-readable medium.

At 432, the policy document 102 is stored in a data store (e.g., data store 202) associated with the device. The set of policy rules specified in the policy document 102 is applied to the software (e.g., software 210) installed on the device at 434. For example, suppose the set of policy rules define the length of time for the screen saver, the policy rules are to be applied to the software. A reporter (e.g., reporter 204) provides feedback to the policy authority 104 indicating whether the set of policy rules is applied successfully to the software at 436.

In the alternative embodiment where a delayed connection is employed, the feedback is stored in another computer-readable medium, and the computer-readable medium is sent (e.g., via mail delivery) to the IT management operating/managing the policy authority 104.

In an alternative embodiment, the interface 128 terminates the first connection with the policy authority 104 after retrieving the policy document from the policy authority. In yet another embodiment, the management interface 214, which provides an API to identify parameters and functions of the software 210, provides additional UI to a user of the device for additional configuration or modifications. For example, suppose an administrator is stationed at the device and wishes to troubleshoot the device 106. With the management interface 214, the administrator may diagnose or troubleshoot the problems and review how the software configurations are applied to the software.

Referring now to FIG. 6, a data structure 600 stored on a computer-readable medium or a computer-readable storage medium for constructing expressions representing software configurations to be applied to software. In one embodiment, the expressions may be XML expressions. The data structure 600 includes a first data field 602 including data identifying a name of software setting for the application. For example, the name of the software configuration may be "screen saver," "toolbar location," or the like. A second data field 604 includes data representing the assertion portion of a rule (e.g. rule included in the policy document 102) about the configuration data identified in the first data field 602. In one embodiment, Appendices B and C illustrate exemplary rule assertion operators, both in simple form and aggregated form, may be used according to an embodiment of the invention. In one embodiment, Appendix D illustrate exemplary rule actions, both in simple form and aggregated form, that may be used according to an embodiment of the invention.

In an alternative embodiment, the second data field 604 includes data representing an operator included in the policy rule represented in the data structure 600. In a further embodiment, the second data field 604 may include data representing a translated expression from the assertion portion of the rule included in the second data field 604 to a custom grammar. In one example, the translated expression may be in the XPath language. The data structure 600 also includes a third data field 608 storing data representing an action portion of a rule. For example, a few types of actions (as shown in appendix D) is described below. In FIG. 6, the example "<value><intfield>10</intfield>" in the third data field 608 illustrates "replace value"—e.g. "set value to 10 when the assertion fails."

In yet another alternative embodiment, the data structure 600 may include one or more data fields for declaration for parametric metadata. For example, the data structure 600 may include a reference to a separate data structure or file including metadata or annotation to supplement or note the data structure 600. For example, an IT management staff X may generate a policy document A (represented by the data structure 600) to be applied to one or more target devices while another IT management staff Y may create a separate file annotating or including metadata about the policy document A. By annotating the policy document A in the separate file, the IT management staff Y may define appropriate or customized annotations or descriptions, such as metadata, without altering or modifying the original policy document A.

In one embodiment, the data structure 600 may include data about the types of policy metadata in a fourth data field 612. For example, the fourth data field 612 may include a precondition rule/in-effect rule. The metadata in the fourth data field 612 may describe or identify conditions that must be true before the assertions on a policy are evaluated. Examples of the metadata of such rules may be "SQL server must be installed" or "Free disk space must be greater than 100 MB" or "It must be a weekday between 6 pm and 6 am or a weekend." Other types of metadata may be used or described in the fourth data field 612 of the data structure without departing from the scope of the invention.

In one embodiment, the metadata in the fourth data field 612 may include data or information other than actions associated with the policy rule. In yet a further embodiment, a feedback different from the feedback provided by the reporter 204 may be sent to the policy authority 104 when the preconditions fail.

In operation, a computer such as the policy authority 104 executes computer-executable instructions such as those illustrated in the figures (e.g., FIG. 1) may be employed to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Scalar Types

| Type |
|---|
| 64-bit long integer, signed and unsigned |
| 32-bit integer, signed and unsigned |
| 8-bit unsigned byte sequence (aka "binary blob") |
| UTF-8 string |
| URI |
| Enumeration |
| Boolean |
| Double (In one example, floating point type may be used to accommodate at least xs: float-sized data and xs: double-sized data.) |
| Datetime |
| Document reference |
| Struct |

APPENDIX B

In the below table, P represents the value of a property variable (a SettingValue), v represents a scalar literal value, and V represents an aggregate literal value:

| Operator | Semantics | Notes |
|---|---|---|
| Equality: P == v where P and v are of compatible type | Returns true if P and v are considered equal. Aggregate equality is that both arrays are the same length and P[i] == v[i] for all i in P. Given that aggregates are unique and unordered, aggregate quality is the same as "P contains exactly the elements of v." | In one embodiment, string equality (e.g., lexical or literal), case-insensitive comparison for strings, whitespace-insensitive comparison for strings, "comparison semantics" for string types, conflict detection (e.g., P == V, P == Y conflicts) and other features may be included. |
| Inequality: P != v where P and v are of compatible type | Returns not (P == v) | Conflict Detection/Examples: P == V, P!=V Conflicts P = {On, Off} P!=On, P!=Off Conflicts |
| Less than: P < v (I believe that all that is really needed is equality, less than, and negation - the others can be defined in terms of these) | Returns true if P is less than v. Not defined for aggregates or structs (See note 2.) | Same comments for equality of string types. Conflict Detection/Examples: Example 1: P < 10, A = 9 P < 5, A = 4 - conflicts Example 2: P < 10, A = 3 P < 5, A = 4 - does not conflict |
| Less than or equal: P <= v | Returns (P < v) or (P == v) Not defined for aggregates or structs (See note 2.) | Conflict Detection/Examples: Similar to above |
| Greater than: P > v | Returns not (P <= v) Not defined for aggregates or structs (See note 2.) | Conflict Detection/Examples: Similar to above |
| Greater than or equal to: P >= v | Returns (not (P < v)) or (P == v) Not defined for aggregates or structs (See note 2. | Conflict Detection/Examples: Similar to above |
| Contains: P.contains(v) where P is an aggregate type and v is a compatible scalar type | Returns true if P.count > 0 and there exists at least one value of i for which P[i] == v. | Strings are not aggregates. To get "string P contains a substring v," use the matches( ) operator. Conflict Detection/Examples: Straight forward |
| Contains: P.contains(V) where P is an aggregate type and v is a compatible aggregate type. | Returns true if (v = V[i]; P.contains(v)) for every i in V | Strings are not aggregates. Conflict Detection/Examples: Straight forward and does not depend on the ordering of the v. Identical to specifying P contains(v1) and P contains (v2) and P contains (v3) where V = {v1, v2, v3} |
| Matches: P.matches(p) where p is a regex pattern and P is a string | Returns true if the regular expression evaluator indicates that P matches the expression p. (See Note 6) | Regex pattern is that which is specified in the XML Schema spec. (See Note 5) |
| Is One Of: P.isOneOf(V) where P is a scalar type and v is an aggregate of a compatible type | Returns true if there exists at least one value of i for which P == V[i] for all i in V. This is the same as V.contains(P) | (See note 4) |

-continued

| Operator | Semantics | Notes |
|---|---|---|
| Aggregate count: P.count( ) op v, where P is an aggregate type, op is one of {equals, less than, less than or equal to, greater than, greater than or equal to}, and v is an integer value | Returns true is the number of values in P meets the criteria stipulated. | |
| Logical negation: not expr | Returns true if expr is false, false if expr is true. | |
| Logical and: expr1 and expr2 | Returns true if expr1 is true and expr is also true, false otherwise. | If expr1 is false, then expr2 may not be evaluated. |
| Logical or: expr1 or expr2 | Returns true if either expr1 or expr2 is true, false otherwise | If expr1 is true, then expr2 may not be evaluated. |

1. "Of compatible type" will need to be formally defined.

2. In one embodiment, an aggregation may be established using P.count==v.count and P[i]<v[i] for all i in P.

3. Expressions are evaluated left-to-right, and in an alternative embodiment, some or all of expressions may not be evaluated in a policy document.

4. IsOneOf may allow restriction of values to a degree even finer than possible by that of an enumeration. For example, the developer may define the enumeration as "Low, Medium, High, Very High," but the allowed values per the admin intent are "Low and Medium." Therefore, the administrator's policy is expressed as an assertion like P.IsOneOf({Low, Medium}). Note that IsOneOf may be used with other scalar types than enums. For instance, the developer may say that the setting is an int between 0 and 100, but the admin can use IsOneOf to restrict the setting to, say, 10, 42, 50, and 85.

5. In one alternative embodiment, the conflict detection may be employed as a static analysis of assertion expressions.

6. An aggregate Matches( ) operator may be defined for aggregates of scalar string types by saying that all elements of the aggregate must match the pattern.

APPENDIX C

In an alternative embodiment, exemplary operators on aggregate types used in the definition of policy rules may be represented as below:

| Operator |
|---|
| Equality: P == v where P and v are of compatible type |
| Inequality: P != v where P and v are of compatible type |

-continued

| Operator |
|---|
| Less than: P < v |
| Less than or equal: P <= v |
| Greater than: P > v |
| Greater than or equal to: P >= v |
| Contains: P.contains(v) where P is an aggregate type and v is a compatible scalar type |
| Contains: P.contains(V) where P is an aggregate type and v is a compatible aggregate type. |
| Matches: P.matches(p) where p is a regex pattern and P is a string |
| Is One Of: P.isOneOf(V) where P is a scalar type and v is an aggregate of a compatible type |
| Aggregate count: P.count( ) op v, where P is an aggregate type, op is one of {equals, less than, less than or equal to, greater than, greater than or equal to }, and v is an integer value |
| Logical negation: not expr |
| Logical and: expr1 and expr2 |
| Logical or: expr1 or expr2 |
| Replace existing value (scalar) |
| Replace existing value (aggregate) |
| Merge scalar w/ existing aggregate value |
| Merge aggregate w/ existing aggregate value |
| Remove existing scalar value from aggregate value (aggregate only) (if ACL contains group1, remove group1) |
| Remove existing values from aggregate value (set difference) |
| Compute compliant value |

APPENDIX D

Exemplary actions to be included in a policy document according to an embodiment of the invention:

| Action | Semantics | Description |
|---|---|---|
| No-op | Does nothing | used to report compliance failure |
| Replace existing value (scalar) | P = v<br>Postconditions:<br>P.equals(v) is true | If P has no prior value (it is not set), then the new value of P is v. If P has a prior value (it is set), then the new value is v. |
| Replace existing value (aggregate) | P = v<br>Postcondition:<br>P.equals(v) is true<br>P[i] == v[i] for all i in v<br>P.count == v.count | If P has no prior value (it is not set), then the new value of P is v. If P has a prior value (it is set), then the new value is v.<br>Elements are added or |

-continued

| Action | Semantics | Description |
|---|---|---|
| Merge scalar w/ existing aggregate value | If P.contains(v), then do nothing, else add v as a new element of P<br>Postcondition:<br>P.contains(v) is true<br>Pnew.count = Pold.count + (Pold.contains(v) ? 0 : 1)<br>P is an aggregate, v is scalar | removed from P such that P and v have the same length. As aggregates are unordered, "where" in the aggregate the new elements are added is not defined or significant. |
| Merge aggregate w/ existing aggregate value | Same as in scalar merge for all v = V[i] for all i in V | |
| Remove existing scalar value from aggregate value (aggregate only) (if ACL contains group1, remove group1) | P = P − v<br>If not P.contains(v) then do nothing, else find the element p = P[i] where p == v, and remove it.<br>Postcondition:<br>P.contains(v) is false<br>Pnew.count = Pold.count − (Pold.contains(v) ? 1 : 0) | |
| Remove existing values from aggregate value (set difference) | P = P − V<br>Same as in scalar remove for all v = V[i] for all i in V | |

What is claimed is:

1. A computer storage device having a data structure stored thereon for constructing expressions representing software configurations to be applied to a software executing on a computing device, said storage device comprising:
   a first data field including data identifying a name of one or more of the software configurations for the software executing on the computing device;
   a second data field including data representing an assertion portion of a policy rule executed by a policy authority for configuring the configurations identified in the first data field to be applied to the software executing on the computing device, wherein the second data field includes data representing an expression from the assertion portion of the rule included in the second data field translated to a custom grammar, said assertion portion of the policy rule indicating an assertion test for configuring said configurations;
   a third data field including data representing an action portion of the policy rule included in the second data field, said action portion of the policy rule indicating an action performed based on the corresponding assertion test represented in the second data field for configuring said configurations, wherein the second data field and the third data field form the policy rule;
   a fourth data field storing metadata describing the policy rule as represented by the first data field, the second data field, and the third data field, said metadata including a precondition rule describing a condition that must evaluate as true before the assertion portion included in the second data field is evaluated;
   a fifth data field storing data representing a feedback to be sent to the policy authority, said feedback indicating whether the condition described in the precondition rule has been satisfied; and
   a program that when executed by a computing device, uses the data fields to configure the configurations of the program.

2. The computer storage device of claim 1, wherein the second data field includes an assertion operator.

3. The computer storage device of claim 1, wherein the fourth data field stores metadata describing policy rule constraints for the policy rule.

4. The computer storage device of claim 1, wherein the first data field comprises data representing a state of the application effected by the software configuration for the application.

5. A computerized method for representing constraints in a policy rule in a policy document for managing software states of a software executing on a computing device, said computerized method comprising:
   receiving, by the computing device, an expression representing the policy rule in the policy document, said expression including operators and operands defining the policy rule, said expression including an assertion portion of the policy rule, an action portion of the policy rule, and a precondition rule of the policy rule, said assertion portion of the policy rule indicating an assertion test performed for configuring the software, and said action portion of the rule indicating an action performed based on the precondition rule evaluating as true and based on the corresponding assertion test of the policy rule;
   identifying, by the computing device, the operators and operands of the policy rule in the received expression;
   translating, by the computing device, the operators and operands in the received expression to generate a constraint expression based on the translated operators and operands and based on evaluating the assertion portion of the policy rule and its corresponding action; and
   providing, by the computing device, the constraints in the generated constraint expression in fragments to the software executing on the computing device, said constraints including values for managing the software state of the software.

6. The computerized method of claim 5, wherein receiving comprises receiving the expression in XPath expression.

7. The computerized method of claim 5, further comprising receiving input from a user for managing the software state of the software.

8. The computerized method of claim 7, wherein receiving input from the user comprises receiving input from the user in the form of XPath expressions.

9. The computerized method of claim 8, further comprising combining the input received from the user and the generated expression, and wherein providing comprises providing the constraints in the generated expression based on the received input and the generated expression.

* * * * *